(12) United States Patent
Song et al.

(10) Patent No.: US 8,280,762 B2
(45) Date of Patent: Oct. 2, 2012

(54) INTEGRATED ADVERTISING MANAGEMENT METHOD AND SYSTEM WITH RESPECT TO PLURALITY OF ADVERTISING DOMAINS

(75) Inventors: Ki Ho Song, Seoul (KR); Byounghak Kim, Seoul (KR); Minuk Kim, Seoul (KR)

(73) Assignee: NHN Business Platform Corporation, Seongnam-si (KR)

( * ) Notice: Subject to any disclaimer, the term of this patent is extended or adjusted under 35 U.S.C. 154(b) by 0 days.

(21) Appl. No.: 13/243,823

(22) Filed: Sep. 23, 2011

(65) Prior Publication Data
US 2012/0016737 A1      Jan. 19, 2012

Related U.S. Application Data

(63) Continuation of application No. 12/055,284, filed on Mar. 25, 2008, now Pat. No. 8,050,966.

(30) Foreign Application Priority Data

Mar. 30, 2007   (KR) ........................ 10-2007-0031532

(51) Int. Cl.
*G06Q 40/00* (2006.01)
(52) U.S. Cl. .......................................... 705/14; 705/10
(58) Field of Classification Search ............... 705/10–44
See application file for complete search history.

(56) References Cited

U.S. PATENT DOCUMENTS

| | | | |
|---|---|---|---|
| 5,957,695 A * | 9/1999 | Redford et al. ........... 434/307 R |
| 7,349,876 B1 | 3/2008 | Veach | |
| 7,861,260 B2 * | 12/2010 | Shkedi ............................. 725/34 |
| 7,933,884 B2 * | 4/2011 | Menezes et al. .............. 707/706 |
| 8,036,936 B2 * | 10/2011 | Ramaswamy et al. ...... 705/14.42 |
| 8,050,966 B2 * | 11/2011 | Song et al. .................. 705/14.69 |
| 2004/0054589 A1 * | 3/2004 | Nicholas et al. ................. 705/14 |
| 2004/0215515 A1 * | 10/2004 | Perry ................................ 705/14 |
| 2008/0243592 A1 * | 10/2008 | Song et al. ....................... 705/10 |
| 2011/0258049 A1 * | 10/2011 | Ramer et al. ................ 705/14.66 |
| 2012/0016737 A1 * | 1/2012 | Song et al. .................. 705/14.43 |
| 2012/0116873 A1 * | 5/2012 | Damm et al. .............. 705/14.49 |

FOREIGN PATENT DOCUMENTS

| | | |
|---|---|---|
| WO | 2006-026030 | 3/2006 |
| WO | 2007-016042 | 2/2007 |

OTHER PUBLICATIONS

Non-Final Office Action dated Aug. 18, 2010 in U.S. Appl. No. 12/055,284.
Non-Final Office Action dated Feb. 4, 2011 in U.S. Appl. No. 12/055,284.
Notice of Allowance dated Jul. 13, 2011 in U.S. Appl. No. 12/055,284.

* cited by examiner

*Primary Examiner* — Frantzy Poinvil
(74) *Attorney, Agent, or Firm* — H.C. Park & Associates, PLC

(57) ABSTRACT

An integrated advertising management method and system with respect to an advertising campaign including a plurality of advertising domains is provided. The integrated advertising management method includes the steps of: generating an advertiser identification associated with an advertiser; in response to a request from the advertiser, setting up an advertisement management component associated with the advertiser identification; and allowing the advertiser to manage the plurality of advertisements included in the advertising campaign by using the advertisement management component such that the advertiser can set up and update at least one of a plurality of conditions for the plurality of advertisements included in the advertising campaign.

9 Claims, 4 Drawing Sheets

INTEGRATED ADVERTISING MANAGEMENT METHOD AND SYSTEM WITH RESPECT TO PLURALITY OF ADVERTISING DOMAINS

CROSS-REFERENCE TO RELATED APPLICATIONS

This application is a continuation of U.S. patent application Ser. No. 12/055,284, filed on Mar. 25, 2008, now U.S. Pat. No. 8,050,966 and claims priority from and the benefit of Korean Patent Application No. 10-2007-0031532, filed on Mar. 30, 2007, both of which are hereby incorporated by reference for all purposes as if fully set forth herein.

BACKGROUND OF THE INVENTION

1. Field of the Invention

The present invention relates to an integrated advertising management method and system, and more particularly, to an integrated advertising management method and system where an advertiser buys and manages an advertising keyword from a search site.

2. Description of Related Art

An advertiser uses a variety of advertising methods to promote and advertise an widely used in the advertising market. Keyword advertising refers to advertising linked to a specific word or phrase. Specifically, in keyword advertising, since an advertiser or advertising agent registers a keyword representing a web site or product of the advertiser's company, an advertisement of the advertiser registering the keyword is displayed as a search result when a user inputs the keyword in a search window.

Keyword advertising requires management and determination for keyword bidding, advertising ranking, advertising domain, and the like. Such keyword management is performed by an advertiser or an advertising agent. In a conventional art, keyword management is generally performed for each keyword bid on by an advertiser. Currently, however, managing a number of advertising keywords becomes more usual than managing a small number of keywords due to the expansion of the advertising market. Accordingly, an advertiser is required to spend much time and effort in keyword management, which causes inefficiency.

To overcome the above-described disadvantage, a keyword management method, which manages keywords by an advertising group including a number of advertising keywords and by an advertising campaign including a number of advertising groups, not by an advertising keyword, is currently used. However, the keyword management method may not integratedly manage various types of advertisements and various advertising domains.

SUMMARY OF THE INVENTION

The present invention provides an integrated advertising management method and system with respect to an advertising campaign including a plurality of advertising domains and various types of advertisements.

The present invention also provides an integrated advertising management method and system with respect to at least one of Uniform Resource Locator (URL) information, keyword information, advertising content, click statistics information, advertising budget information, targeting information, advertising period information, advertising exposure frequency information, bidding information, rank information, maximum CPC information, and exposure domain information about a plurality of advertising domains, and the integrated advertising management method and system optimally determines the at least one of the above information items associated with the plurality of advertising domains.

According to an embodiment of the present invention, there is provided an integrated advertising management method, including the steps of: generating an advertiser identification associated with an advertiser; in response to a request from the advertiser, setting up an advertisement management component associated with the advertiser identification; and allowing the advertiser to manage the plurality of advertisements included in the advertising campaign by using the advertisement management component such that the advertiser can set up and update at least one of a plurality of conditions for the plurality of advertisements included in the advertising campaign. The advertisement management component includes at least one advertising campaign and the advertising campaign includes a plurality of advertisements for the advertiser.

The plurality of conditions include a plurality of payment schemes that include a Cost Per Click (CPC) advertising scheme and a Cost Per Thousand (CPM) advertising scheme, a context advertisement (CA) advertising scheme, and an external site advertising scheme.

In an aspect of the present invention, the advertisement management component displays at least one of URL information of the web page to be advertised, keyword information, advertising content associated with each of the advertisements, click statistics information associated with each of the advertisements, advertising budget information, bidding conditions associated with each of the advertisements, targeting information, advertising period for each of the advertisements, advertising exposure frequency information associated with each of the advertisements, bidding information associated with each of the advertisements, rank information associated with each of the advertisements and maximum CPC information associated with each of the advertisements.

In an aspect of the present invention, the plurality of conditions include at least one item of Uniform Resource Locator (URL) information of the web page to be advertised, keyword associated with the advertisements, advertising content associated with the advertisements, bidding conditions associated with each of the advertisements, advertising budget associated with the advertisements and advertising period for each of the advertisements.

According to another embodiment of the present invention, there is provided an integrated advertising management system, including: a generation component configured for generating advertiser identification associated with an advertiser; a component configured for setting up an advertisement management component associated with the advertiser identification in response to a request from the advertiser; and the advertisement management component configured for allowing the advertiser to manage the plurality of advertisements included in the advertising campaign such that the advertiser can set up and update at least one of a plurality of conditions for the plurality of advertisements included in the advertising campaign.

In an aspect of the present invention, the integrated advertising management system further includes: an output component outputting an integrated management result of the advertising campaign, when a user inputs a keyword included in the advertising campaign.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF THE ILLUSTRATED EMBODIMENTS

Figure 1:
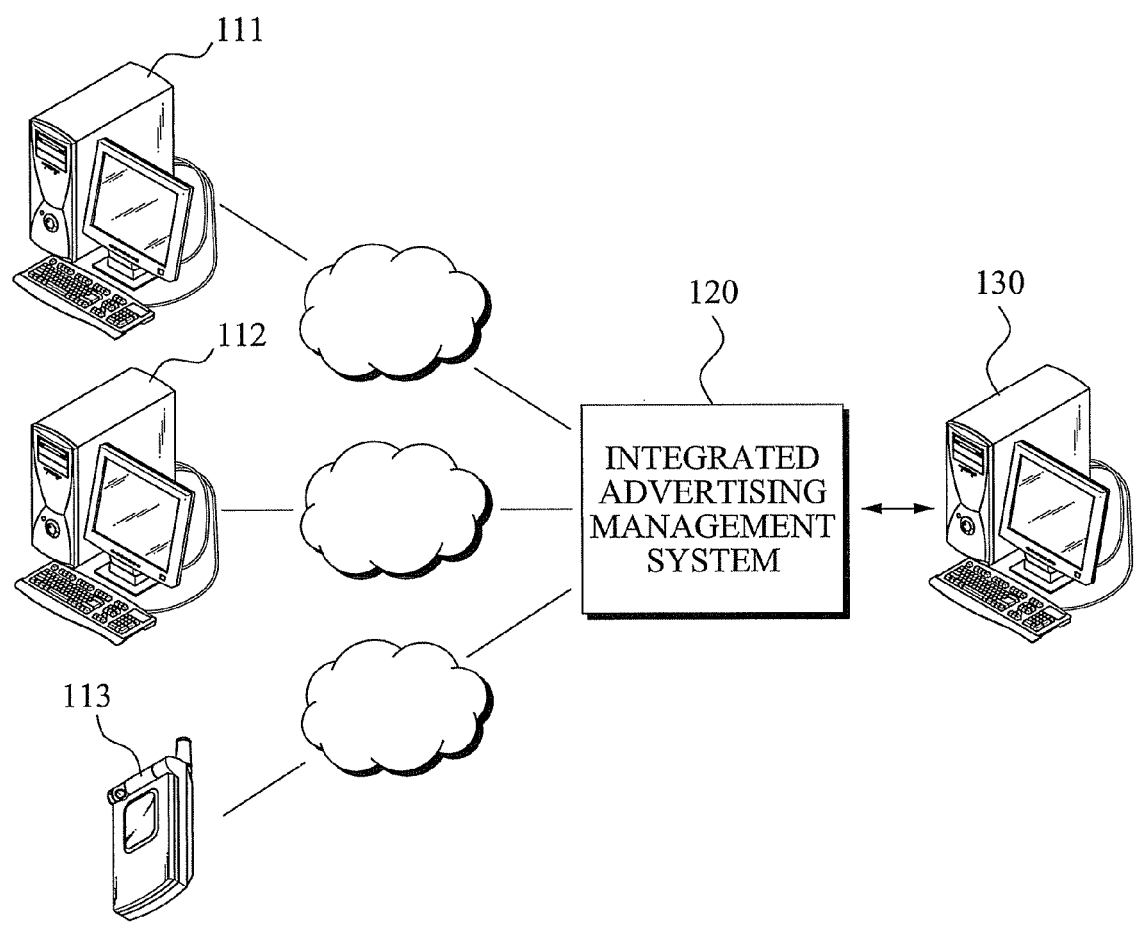
FIG. 1 is a diagram illustrating an integrated advertising management system with respect to a plurality of advertising domains according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a module. One or more components can reside within a process and/or thread of execution, and a module or component can be localized on one computer and/or distributed between two or more computers.

As used herein, the terms "desktop," "PC," "local computer," and the like, refer to computers on which systems (and methods) according to the invention operate. In the illustrated embodiments, these are personal computers, such as portable computers and desktop computers; however, in other embodiments, they may be other types of computing devices (e.g., workstations, mainframes, personal digital assistants or PDAs, music or MP3 players, and the like).

FIG. 1 is a diagram illustrating an integrated advertising management system 120 with respect to a plurality of advertising domains according to an exemplary embodiment of the present invention.

As illustrated in FIG. 1, the integrated advertising management system 120 with respect to the plurality of advertising domains may expose various types of advertisements with respect to the plurality of advertising domains to users 111, 112, and 113 connected to a network. Also, an advertiser may integratedly manage an advertising campaign including the campaign as a unit. The advertiser's terminal 130 is connected to the integrated advertising management system 120.

To integratedly manage advertising through the advertising campaign including the plurality of advertising domains associated with various payment schemes, such as a Cost Per Click (CPC), a Cost Per Thousand (CPM), a context advertisement (CA), and an external site advertising, various items of information about the plurality of advertising domains is required. The various items of information may be received from the advertiser or an advertising agent, or optimally determined by the integrated advertising management system 120 based on information received from the advertiser. For this, the integrated advertising management system 120 may maintain a connection with the advertiser or the advertising agent through an interface directly connected to the integrated advertising management system 120 or the advertiser's terminal 130.

Figure 2:
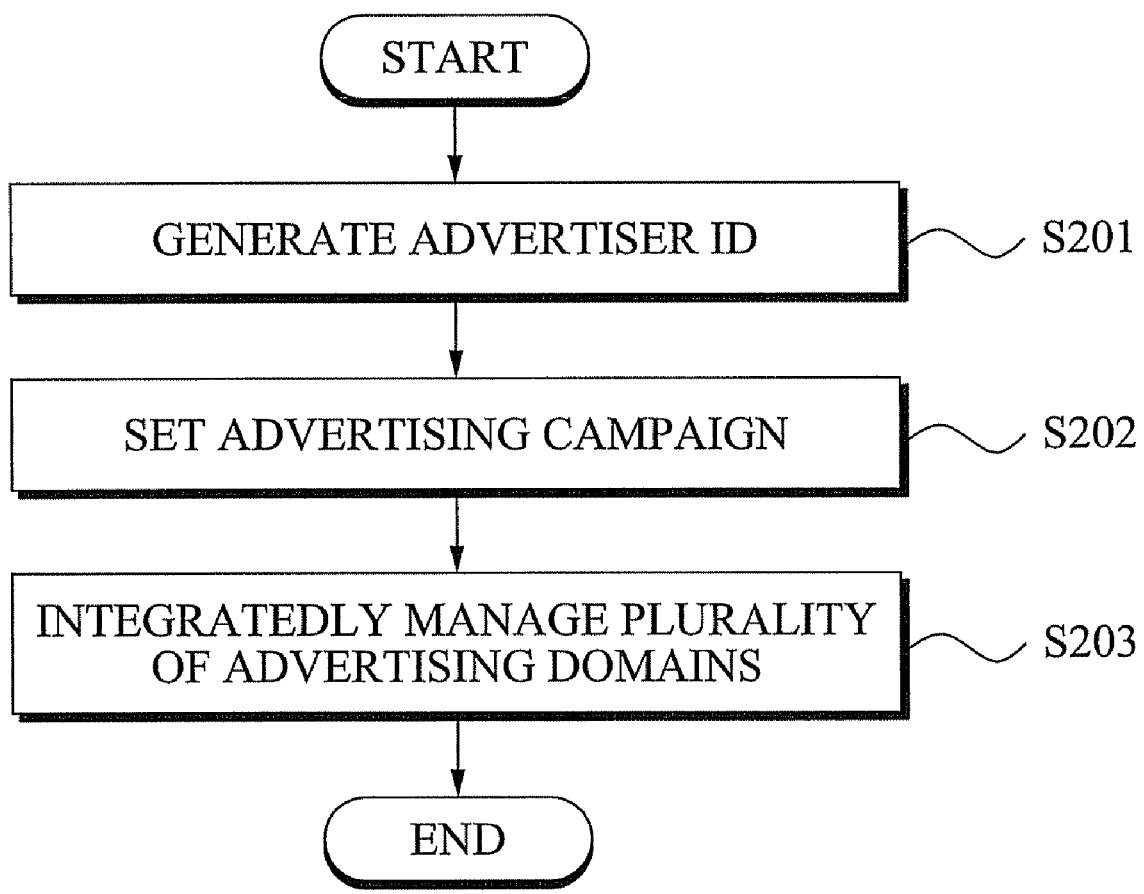
FIG. 2 is a flowchart illustrating an integrated advertising management method with respect to a plurality of advertising domains according to an exemplary embodiment of the present invention.

FIG. 2 is a flowchart illustrating an integrated advertising management method with respect to a plurality of advertising domains according to an exemplary embodiment of the present invention. The integrated advertising management method is performed as illustrated in FIG. 2.

In operation S201, an integrated advertising management system with respect to the plurality of advertising domains may generate an advertiser identification (ID) associated with an advertiser. Since the integrated advertising management system integratedly manages an advertising campaign associated with the advertiser, the integrated advertising management system may generate the advertiser ID which identifies the advertiser and is suitable for being provided with various items of information included in the advertising campaign. The integrated advertising management system may sequentially provide the advertiser with the advertiser ID as a serial number. As another exemplary embodiment, the advertiser ID may be received from the advertiser.

In operation S202, the integrated advertising management system may set an advertising campaign corresponding to the advertiser ID. Specifically, the advertising campaign desired to be integratedly managed by the advertiser may be set in association with the advertiser ID. The advertising campaign may include an advertising group and keyword. The advertising group may be a set of keywords including at least one keyword, and the advertising campaign may be a set of advertising groups including at least one advertising group. For example, an advertising group A including a keyword of television (TV)/video/audio and an advertising group B including a keyword of washing machine/refrigerator/cleaner may be included in an advertising campaign. In operation S202, the integrated advertising management system may set at least two advertising domains of a CPC advertising domain, a CPM advertising domain, a CA advertising domain, and an external site advertising domain which are associated with the advertiser, in the advertising campaign. The advertising group and keyword described above is a subordinate concept of the advertising campaign, and thus the advertising group and keyword may be set and integratedly managed in association with the plurality of advertising domains. The setting in operation S202 is described in greater detail with reference to FIG. 3.

In operation S203, the integrated advertising management system may integratedly manage the plurality of advertising domains included in the advertising campaign according to a request from the advertiser authorized by the advertiser ID. As described above, the plurality of advertising domains included in the advertising campaign may be the CPC advertising domain, CPM advertising domain, CA advertising domain, and external site advertising domain. In operation S203, the integrated advertising management system may integratedly manage at least one item of information being composed of Uniform Resource Locator (URL) information, keyword information, advertising content, click statistics information, advertising budget information, targeting information, advertising period information, advertising exposure frequency information, bidding information, rank information, maximum CPC information, and exposure domain information about the plurality of advertising domains. The integrated management may be performed in a way that the advertiser sets the at least one of the above-described items of information so that the at least one of the above-described items of information changes by reflecting the setting of the advertiser through the integrated advertising management system, and so that the at least one of the above-described items of information changes and is maintained in real time.

The URL information may include representative URL information and landing URL information. A URL is a standard for representing a location of information on the Internet. In general, a web browser is a tool simultaneously supporting various types of services on the Internet. A URL is used as a scheme for representing the location of information to obtain necessary information from among a number of servers providing the various types of services. A URL address represents a location of files of each server providing a service on the web, and includes a type of service to be connected, location of server, and location of file. URL is generally configured as 'protocol://a name of a computer including information/directory name/file name', and thus a structure of the URL information may be configured as described above. The URL information may include at least one URL. The representative URL information may be URL information of a company's official webpage or advertiser's targeting site. The landing URL information may be URL information of a webpage shown when a user clicks an advertisement of the advertiser. In this instance, the webpage is a webpage desired by the advertiser.

The keyword information may refer to keyword information included in the advertising campaign. Also, the keyword information may be managed for each advertising group and advertising campaign. A representative keyword about the advertising group and advertising campaign may be extracted from the keyword information. In operation S203, the integrated advertising management system may extract a keyword associated with the URL information from the URL information and include the keyword in the keyword information. As an exemplary embodiment of retrieving the associated keyword, a method of determining a degree of association based on the URL information may be used. As another exemplary embodiment of retrieving the associated keyword, a method of determining a degree of association between a keyword included in each pair set and URL included in each of the pair sets exists. In the method, a plurality of URLs, corresponding to a search result of the keyword, and the keyword are set as a plurality of pair sets, an appearance frequency of each of the pair sets is measured, and the appearance frequency is compared to determine the degree of association.

The advertising content may refer to an advertising title and abstract included in a webpage as a search result in a search site, and be a type of advertising. The advertising content may be managed in connection with any one of the advertising campaign, advertising group, and keyword. Also, the advertising content may be integratedly managed in connection with the plurality of advertising domains included in the advertising campaign.

The click statistics information may include information about a number of exposures, information about a number of clicks, and click-through rate (CTR) information in connection with any one of the keyword information and advertising content. CTR is a percentage indicating a number of clicks on an advertisement from among a number of exposures of the advertisement. In the exemplary embodiment of the present invention, the CTR may be determined through a percentage calculation using the information about the number of exposures and the information about the number of clicks. The click statistics information may be CTR information about the advertising content or keyword information.

The advertising budget information may include information about a budget set by the advertiser for advertising associated with the advertising campaign. The advertising budget information may be set as a unit of each of the advertising campaign, advertising group, and keyword, and may be set with respect to each of the plurality of advertising domains. The targeting information may be information targeted to an age or gender of a user exposed to the advertisement through the advertising campaign. A targeting object may be determined according to a type of media, domain, and contents where the advertisement is exposed.

The advertising period information is information about a period that the advertisement, associated with the advertising campaign including the plurality of advertising domains, is placed. The advertising period information may be set as the unit of each of the advertising campaign, advertising group, and keyword, and may be set with respect to each of the plurality of advertising domains. The advertising exposure frequency information may refer to information about a number of times advertising information such as the advertising content associated with the advertising campaign is exposed.

The bidding information may include a keyword to bid for the advertisement from among a plurality of keywords included in the keyword information, and information about a bidding price, bidding date, and expected bidding rival of the keyword in association with the advertising campaign including the plurality of advertising domains. The rank information may include rank information of each of the plurality of keywords to be bid on for the advertisement, and rank information of the advertising content to be exposed in association with the keyword. The maximum CPC information may include maximum budget information which may be set by the advertiser for advertising in a CPC domain and maximum ratio information taken by the CPC domain with respect to the plurality of advertising domains included in the advertising campaign. The exposure domain information may refer to information about a domain where the advertisement is to be exposed through the advertising campaign including the plurality of advertising domains.

According to an exemplary embodiment of the present invention, in operation S203, the integrated advertising management system may optimally determine the at least one, that is the at least one of the above-described items of information such as the URL information through the exposure domain information, associated with the plurality of advertising domains. Specifically, the above-described items of information may be integratedly managed by setting of the advertiser and be optimally determined using the at least one of the above-described information.

In operation S203, the integrated advertising management system may optimally determine the bidding information based on the advertising budget information and a degree of association between the keyword information and a site of the URL information, in order to optimally determine the at least one of the above-described items of information. Specifically, in order to optimally determine the bidding information, the integrated advertising management system determines the advertising budget information, or determines the degree of association between the keyword information and the site or the site page of the representative URL information and the landing URL information included in the URL information. To determine the degree of association between the keyword information and the site of the URL information, the integrated advertising management system may analyze a degree of association between each of the plurality of the keywords and word information extracted from the site, for example, an appearance frequency. Also, to optimally determine the bidding information, the integrated advertising management system may analyze an advertising budget amount included in the budget information.

In operation S203, to optimally determine the at least one of the above-described information, the integrated advertising management system may optimally determine the advertising content based on the click statistics information. The integrated advertising management system may randomly expose a plurality of T&Ds included in the advertising content to a search result, analyze click statistics information of each of the plurality of randomly exposed T&Ds, and optimally determine the advertising content.

For example, when a plurality of titles included in advertising content associated with a keyword of 'basketball shoes' is 'AUCTION basketball shoes', 'basketball shoes is AUCTION', and 'basketball shoes AUCTION search', and a CTR of 'AUCTION basketball shoes' is 17%, a CTR of 'basketball shoes is AUCTION' is 15%, and a CTR of 'basketball shoes AUCTION search' is 10% by referring to a CTR determined through the click statistics information, the integrated advertising management system may determine a T&D including 'AUCTION basketball shoes' as a title with respect to the keyword of 'basketball shoes' as an optimal advertising content. Also, the integrated advertising management system may identically analyze the advertising content using the advertising group and advertising campaign, which is a super ordinate concept of 'basketball shoes', as a unit.

According to another exemplary embodiment of the present invention, the integrated advertising management method may further include an operation of determining expected CPC information and expected CTR information based on the URL information, keyword information, advertising content, click statistics information, advertising budget information, targeting information, advertising period information, advertising exposure frequency information, bidding information, rank information, maximum CPC information, and exposure domain information. The integrated advertising management system may determine the expected CPC information and expected CTR information using the above-described information integratedly managed in operation S203. The expected CPC information may include information about an expected number of clicks and expected cost information with respect to an advertising phrase and advertising information. The advertising phrase and advertising information includes the advertising content exposed to the plurality of advertising domains included in the advertising campaign. The CTR information may include expected CTR information about the advertising phrase and advertising information including the advertising content exposed to the plurality of advertising domains included in the advertising campaign. The expected CPC information and expected CTR information may be determined based on the above-described information of the advertiser, and may be determined by referring to information about another advertiser.

Figure 3:
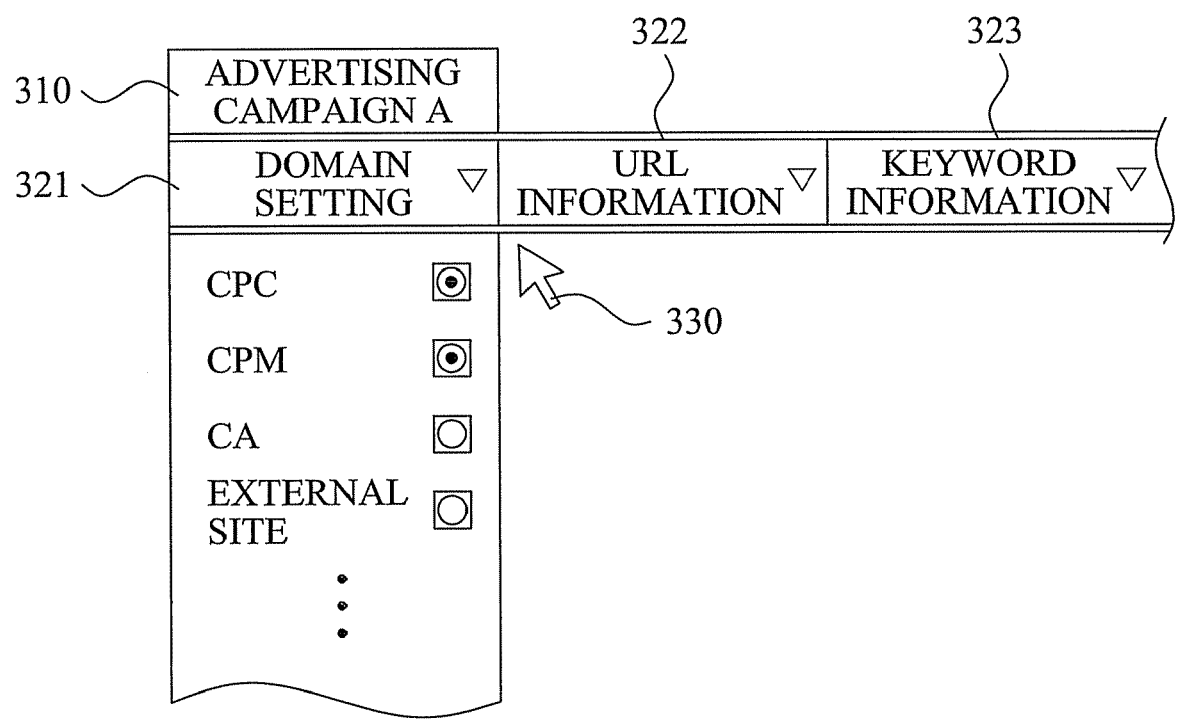
FIG. 3 is a diagram illustrating an example of setting an advertising campaign including a plurality of advertising domains according to an exemplary embodiment of the present invention.

FIG. 3 is a diagram illustrating an example of setting an advertising campaign including a plurality of advertising domains according to an exemplary embodiment of the present invention. As illustrated in FIG. 3, at least two advertising domains of a CPC advertising domain, a CPM advertising domain, a CA advertising domain, and an external site advertising domain which are associated with an advertiser may be set in advertising campaign A 310 of the advertiser. As illustrated in FIG. 3, after the advertiser clicks a domain setting 321 with a mouse pointer 330, at least two advertising domains may be set in advertising campaign A 310 of the advertiser. The example illustrated in FIG. 3 may be an example of interface provided to the advertiser for integrated management. Also, as described with reference to FIG. 2, information such as URL information 322 and keyword information 323 may be set or managed by the interface through exposure domain information, A CPC advertising is an advertising model where an advertiser pays only when a user actually clicks on an advertisement regardless of a number of exposures after searching. That is, in the CPC advertising, after depositing a particular amount of money determined by the advertiser in advance, an advertisement is exposed in a search result, and a cost per click is deducted from the deposited money only when a user clicks a linked site. Advantages of the CPC advertising are that the advertisement may be placed only during a period desired by the advertiser, and ranking may be controlled by the advertiser. That is, an advertising cost may be strategically set to be close to an approximate value expected by the advertiser. Also, in a case of a refund since advertising is not required, the advertising cost is fully refundable after a refund period. For the CPC advertising, however, monitoring by the advertiser is required, and an unexpected advertising cost may be spent, which are disadvantages of the CPC advertising. According to an exemplary embodiment of the present invention, the disadvantages may be overcome since a strategic approach with respect to the plurality of advertising domains included in the advertising campaign is feasible.

A CPM advertising is an advertising model where an advertisement is placed for a predetermined time based only on a fixed amount of money with respect to the advertisement, regardless of an exposure and click, when the fixed amount of money is set as a flat rate. An advantage of the CPM advertising is that separate management is not required since a fixed advertising domain may be maintained when the fixed amount of money is paid for the predetermined time. However, the advertisement is required to be placed without reflecting a situation of the advertiser or even when the advertiser does not desire to place the advertisement. That is, the situation of the advertiser may not be accurately reflected. However, according to an exemplary embodiment of the present invention, the above disadvantages may be overcome since a strategic approach with respect to the plurality of advertising domains included in the advertising campaign is feasible.

A CA advertising is not limited to a search result page of a search portal site which is a domain where the CPC advertising and CPM advertising are exposed. In the CA advertising, an advertisement of the advertiser is exposed to various types of contents page provided by the search portal site, and the advertisement is widely exposed to the user. Also, in the CA advertising, an advertisement most highly associated with the contents page is exposed in the search portal site and provided to the user. The external site may include all sites on the Internet, excluding a site of the advertiser.

According to an exemplary embodiment of the present invention, the integrated advertising management method may output an integrated management result of the advertising campaign, when the user inputs a keyword included in the advertising campaign. The integrated management result may include a ranking result about a CTR, quality index, and account balance with respect to each of a plurality of keywords included in the advertising campaign.

The user may include a user which searches through a search window of the search portal site. When the user inputs the keyword included in the advertising campaign, the integrated management result of the advertising campaign may be outputted for the advertiser. The integrated advertising management system may provide an output result to the advertiser in real time and expose the output result according to a request from the advertiser. The integrated management result may include the ranking result about the CTR, quality index, and account balance with respect to each of the plurality of keywords included in the advertising campaign.

The quality index is an advertising evaluation index. The quality index may refer to an index including elements associated with advertising quality from an aspect of the user, for example, a degree of association between a keyword and T&D, a degree of association between a targeting site and the keyword, and an advertising effect. The quality index may prevent an unreasonable rise in cost and ranking competition from occurring, and enable better quality-advertising to be first exposed. Also, the quality index may enable more accurate search results to be provided to a search service user, and enable the advertiser to pay a reasonable advertising cost. The account balance may refer to a balance of an account with respect to the advertising campaign, and be determined based on the advertising budget information.

Figure 4:
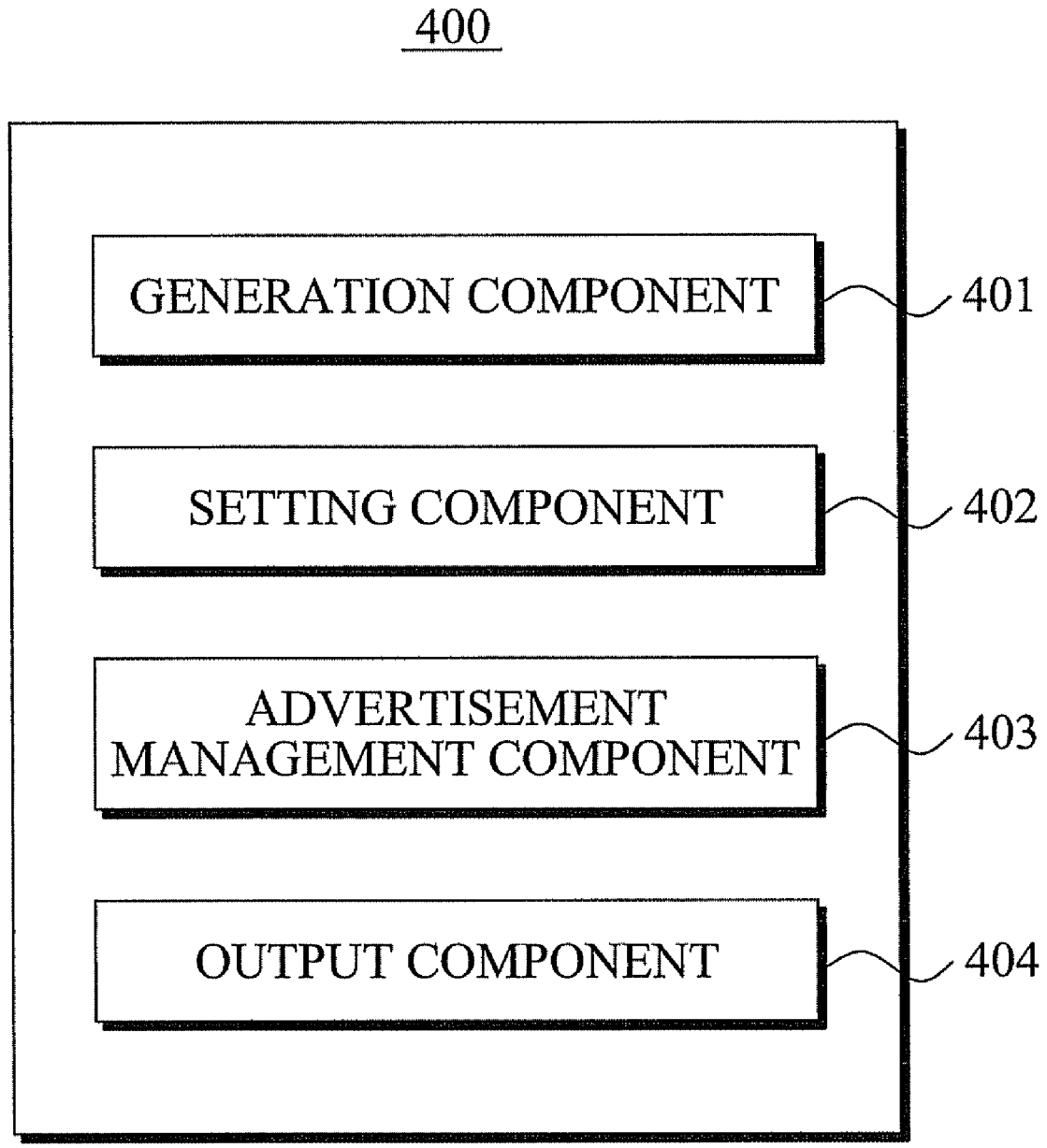
FIG. 4 is a block diagram illustrating an integrated advertising management system with respect to a plurality of advertising domains according to an exemplary embodiment of the present invention.

FIG. 4 is a block diagram illustrating an integrated advertising management system 400 with respect to a plurality of advertising domains according to an exemplary embodiment of the present invention. As illustrated in FIG. 4, the integrated advertising management system 400 may include a generation component 401, a setting component 402, an advertisement management component 403, and an output component 404.

The generation component 401 generates an advertiser ID associated with an advertiser. The setting component 402 sets an advertising campaign corresponding to the advertiser ID. The advertisement management component 403 integratedly manages a plurality of advertising domains included in the advertising campaign according to a request from the advertiser authorized using the advertiser ID. The output component 404 outputs an integrated management result of the advertising campaign, when a user inputs a keyword included in the advertising campaign.

The exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

According to the present invention, an integrated advertising management system and method generates an advertiser ID associated with an advertiser, sets an advertising campaign corresponding to the advertiser ID, integratedly manages a plurality of advertising domains included in the advertising campaign according to a request from the advertiser authorized by the advertiser ID, and thereby may integratedly manage the plurality of advertising domains such as a CPM advertising domain, CPC advertising domain, external site advertising domain, and context advertising domain, as opposed to a single advertising campaign of a single product or single advertising domain.

Also, according to the present invention, an integrated advertising management system and method enables an advertiser to easily manage advertising, effectively manage an advertising policy through determining an optimal advertising, and enables a user to be exposed to an appropriate advertisement.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that relative terms are intended to encompass different orientations of the device in addition to the orientation depicted in the Figures.

Moreover, it will be understood that although the terms first and second are used herein to describe various features, elements, regions, layers and/or sections, these features, elements, regions, layers and/or sections should not be limited by these terms. These terms are only used to distinguish one feature, element, region, layer or section from another feature, element, region, layer or section. Thus, a first feature, element, region, layer or section discussed below could be termed a second feature, element, region, layer or section, and similarly, a second without departing from the teachings of the present invention.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Further, as used herein the term "plurality" refers to at least two elements. Additionally, like numbers refer to like elements throughout.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. Section 112, sixth paragraph, unless the element is expressly recited using the phrase "means for" or, in the case of a method claim, the element is recited using the phrase "step for."

What is claimed is:

1. A method using a processor, the method comprising:
   providing an advertisement campaign, the advertisement campaign being edited associated with selections of one or more of advertising domains specifying conditions of providing the advertisement campaign, wherein the one or more of advertising domains comprise a search advertising domain, a content advertising domain, or both the search advertising domain and the content advertising domain; and
   assigning, by the processor, an advertiser identification (ID) corresponding to the advertisement campaign to control and to monitor effects of the advertisement campaign according to the detection of the selections of the one or more of advertising domains.

2. The method of claim 1, wherein the search advertising domain comprises providing an advertisement relevant to a search query if a keyword associated with the advertisement being matched with the search query.

3. The method of claim 1, wherein the content advertising domain comprises providing an advertisement if a keyword associated with the advertisement is exposed to various types of contents page.

4. The method of claim 1, wherein the specifying conditions of the advertisement campaign comprises providing a plurality of payment schemes comprising a Cost Per Click (CPC) advertising scheme and a Cost Per Thousand (CPM) advertising scheme.

5. The method of claim 1, wherein providing an advertisement campaign comprises at least one of providing a Uniform Resource Locator (URL) information of a web page associated with the advertising domains, providing keyword information associated with the advertising domains, providing an advertising content associated with each of the advertising domains, providing click statistics information associated with each of the advertising domains, providing advertising budget information, providing bidding conditions associated with each of the advertising domains, providing targeting information, providing an advertising period for each of the advertising domains, providing advertising exposure frequency information associated with each of the advertising domains, providing bidding information associated with each of the advertising domains, providing rank information associated with each of the advertising domains, providing maximum Cost Per Click (CPC) information associated with each of the advertising domains, or any combination thereof.

6. The method of claim 1, wherein the specifying conditions of the advertisement campaign comprises providing one of Uniform Resource Locator (URL) of web pages associated with selections of one or more of advertising domains to be advertised, determining keywords according to the advertisement campaign, providing advertising contents according to the selection of the advertising domains, providing bidding conditions associated with the selected advertising domains, advertising budget information associated with the selected advertising domains, providing an advertising period for the advertising campaign, or any combination thereof.

7. The method of claim 6, further comprising
   determining the advertising contents associated with the advertising domains based upon click statistics information associated with each of the advertising domains.

8. The method of claim 7, wherein determining the advertising contents further comprises:
   randomly exposing a plurality of the advertising contents to a search result;
   analyzing click statistics information of each of the plurality of randomly exposed the advertising contents; and
   determining optimal advertising contents to be displayed.

9. One or more non-transitory computer-readable storage media comprising executable computer programs, which when executed by one or more processors, causes the one or more processors to perform:
   providing an advertisement campaign, the advertisement campaign being edited associated with selections of one or more of advertising domains specifying conditions of providing the advertisement campaign, wherein the one or more of advertising domains comprise a search advertising domain, a content advertising domain, or both the search advertising domain and the content advertising domain; and
   assigning an advertiser identification (ID) corresponding to the advertisement campaign to control and to monitor effects of the advertisement campaign according to the detection of the selections of the one or more of advertising domains.

* * * * *